United States Patent [19]

Maxwell, Sr.

[11] 4,107,797

[45] Aug. 22, 1978

[54] MATTRESS SUSPENSION SYSTEM

[76] Inventor: George E. Maxwell, Sr., 825 E. Sheridan, Phoenix, Ariz. 85006

[21] Appl. No.: 805,278

[22] Filed: Jun. 10, 1977

[51] Int. Cl.² .......................................... B62D 25/00
[52] U.S. Cl. .......................................... 5/118; 5/60; 296/24 R
[58] Field of Search ....................................... 5/60–63, 5/118, 105; 296/24 R, 28

[56] References Cited

U.S. PATENT DOCUMENTS

| 3,371,359 | 3/1968 | Donie | 5/118 |
| 3,612,599 | 10/1971 | Sternberg | 5/118 |
| 3,902,205 | 9/1975 | Bell | 5/118 |

Primary Examiner—Casmir A. Nunberg
Attorney, Agent, or Firm—Cahill, Sutton & Thomas

[57] ABSTRACT

A mattress suspension system is attachable to a horizontally oriented deck of a vehicle for substantially reducing the amplitude of fore-and-aft excursions and of up and down excursions which are transmitted by the vehicle to an individual reclining on a mattress positioned above the suspension system. The suspension system includes a lower frame which can be attached to the vehicle deck. An intermediate frame is positioned above the lower frame and includes a plurality of rollers on each end thereof. The rollers are movably fitted within a horizontally oriented roller guide which is coupled to each end of the lower frame. Fore-and-aft movement of the intermediate frame with respect to the lower frame is permitted by the rolling movement of the rollers within the roller guides. An upper frame is positioned between the mattress and the intermediate frame. A damper system is coupled between the upper and intermediate frames and serves to maintain the upper frame above and in a fixed fore-and-aft position with respect to the intermediate frame. The damper also permits damped up and down excursions between the upper frame and the intermediate frame in response to up and down excursions of the vehicle.

10 Claims, 8 Drawing Figures

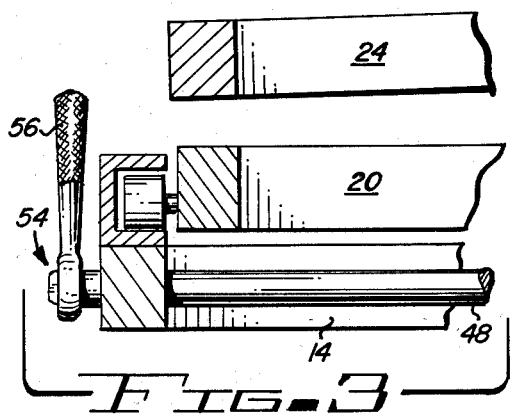
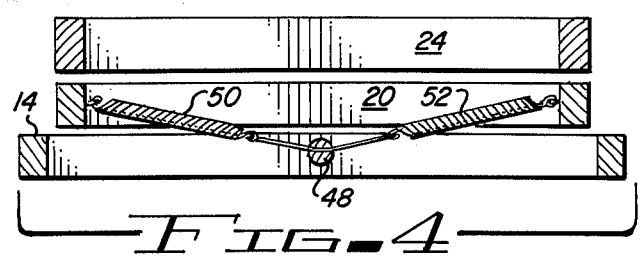
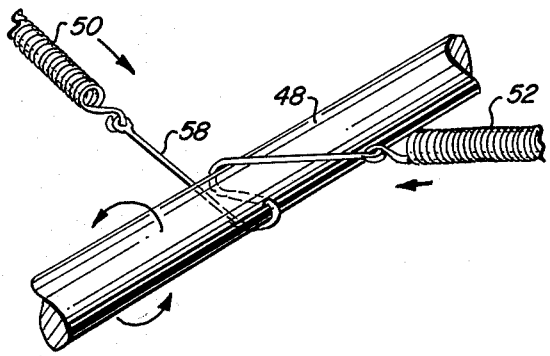
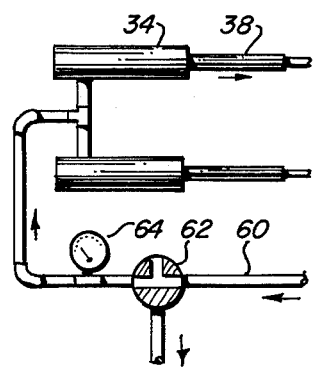
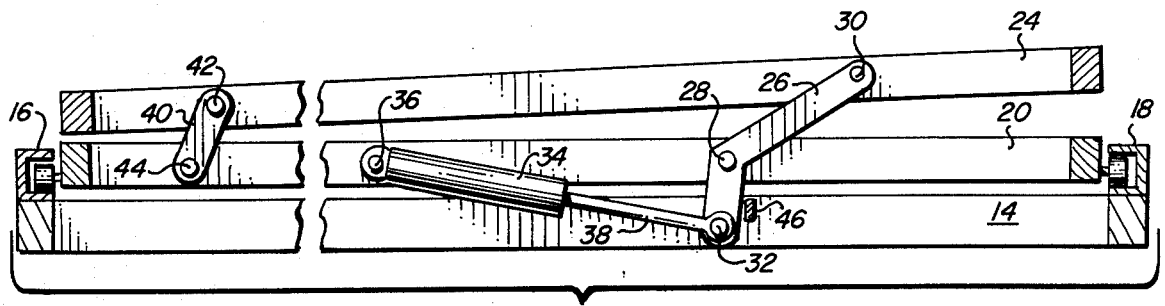
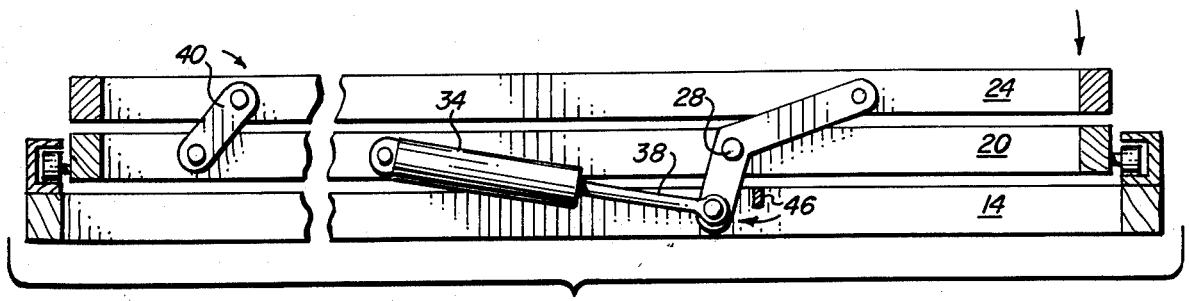

MATTRESS SUSPENSION SYSTEM

BACKGROUND OF THE INVENTION

1. Field of the Invention

This invention relates to suspension systems, and more particularly, to suspension systems for vehicle mounted beds.

2. Description of the Prior Art

Automobiles include highly sophisticated suspension systems which do an excellent job of isolating the passenger compartment from road induced shocks. The cab of a deisel powered truck, on the other hand, is essentially rigidly coupled to the truck frame and directly transmits to individuals in the cab all fore-and-aft and vertical excursions which are produced by irregularities and undulations in the road surface. With the escalating cost of trucks and trailer rigs, it is becoming increasingly important to maximize the utilization of these vehicles. In order to do so a pair of drivers is typically assigned to a truck so that the truck can be driven continuously for long periods of time to reach a remote destination. While one driver performs his driving duties, the other driver can be sleeping on a mattress attached to a horizontally oriented deck within the truck cab. Due to the direct coupling of the cab to the truck frame, it is highly important that some sort of an isolation means or suspension system be positioned between the mattress and the horizontally oriented deck of the vehicle to reduce the amplitude of the fore-and-aft and vertical pitching movements of the cab.

Various systems have been proposed in the past to accomplish this purpose. U.S. Pat. No. 3,760,436 (Zach) discloses a mattress suspension system which includes a horizontal mattress tray which is coupled to the system by a group of four vertically oriented straps. These straps allow the tray to swing in a fore-and-aft direction in order to decouple the mattress from fore-and-aft excursions of the truck cab. This device also includes an air spring biased scissor linkage to dampen the up and down excursions of the cab. The primary disadvantage of the Zach apparatus is that it requires a fairly substantial volume of the sleeping compartment of the truck cab and may unduly crowd a truck driver of physically large size. The scissor linkage and the air spring occupy a significant vertical distance and the vertically extending tray support bars coupled to each end of the suspension system are by design required to extend above the floor of the tray in order to permit a pendulum-like swing of the tray. This vertical extension of the ends of the suspension system reduces the total available length of the mattress which may be inserted within the very confined sleeping area of the truck cab.

A number of other suspension systems which are mechanically highly complicated and which only damp vertically oriented excursions of the truck cab are disclosed in the following U.S. Pat. Nos. 3,299,447 (Dome), 3,371,359 (Dome), 3,067,437 (Campbell), 3,882,558 (Christensen). None of these devices provide any means for decoupling or damping the fore-and-aft excursions of the truck cab.

Other less relevant prior art suspension systems are disclosed in the following U.S. Pat. Nos. 1,664,129 (Pallenberg) and 3,902,205 (Bell).

SUMMARY OF THE INVENTION

It is therefore a primary object of the present invention to provide a mattress suspension system which is highly compact in its vertical dimension and which in no way reduces the length of a mattress which would otherwise be useable within the sleeping compartment of a vehicle.

Another object of the present invention is to provide a mattress suspension system which substantially reduces the amplitude of fore-and-aft excursions and of up and down excursions which are transmitted by a vehicle to an individual reclining on a mattress positioned above the suspension system.

Yet another object of the present invention is to provide a mattress suspension system which can be adjusted to function with individuals of a wide variety of body weights.

Still another object of the present invention is to provide a mattress suspension system which is mechanically uncomplicated and inherently reliable.

Yet another object of the present invention is to provide a mattress suspension system which can be readily installed in and removed from a vehicle.

A still further object of the present invention is to provide a mattress suspension system which is inexpensive to fabricate.

Briefly stated, and in accord with one embodiment of the invention, a mattress suspension system is attachable to the horizontally oriented deck of a vehicle for substantially reducing the amplitude of fore-and-aft excursions and of up and down excursions which are transmitted by the vehicle to an individual reclining on a mattress positioned above the suspension system. The system includes a lower frame positionable above and attachable to the deck of the vehicle. The lower frame includes guide means on its first and second ends. An intermediate frame includes roller means on its first and second ends. The roller means are moveably coupled to the guide means to permit a limited amount of fore-and-aft travel of the intermediate frame with respect to the lower frame in response to fore-and-aft excursions of the vehicle. An upper frame is positioned below the mattress and above the lower and intermediate frames. Damper means is coupled to the upper and the intermediate frames to maintain the upper frame above and in a fixed fore-and-aft position with respect to the intermediate frame. The damper means also permits damped up and down excursions between the upper frame and the intermediate frame in response to up and down excursions of the vehicle.

DESCRIPTION OF THE DRAWING

The invention is pointed out with particularity in the appended claims. However, other objects and advantages, together with the operation of the invention, may be better understood by reference to the following detailed description taken in connection with the following illustrations wherein:

FIG. 3 is a partial sectional view of the mattress suspension system illustrated in FIG. 2, taken along section line 3—3.

FIG. 4 is a sectional view of the mattress suspension system illustrated in FIG. 2, taken along section line 4—4.

FIG. 5 is a partially cutaway perspective view of one element of the fore-and-aft biasing means of the present invention.

FIG. 6 is a sectional view of the mattress suspension system shown in FIG. 2, taken along section line 6—6.

FIG. 7 shows the mattress suspension system of FIG. 6 in the compressed position.

FIG. 8 illustrates the damper biasing means of the mattress suspension system.

DESCRIPTION OF THE PREFERRED EMBODIMENT

In order to better illustrate the advantages of the invention and its contributions to the art, a preferred hardware embodiment of the invention will now be described in some detail.

Figure 1:
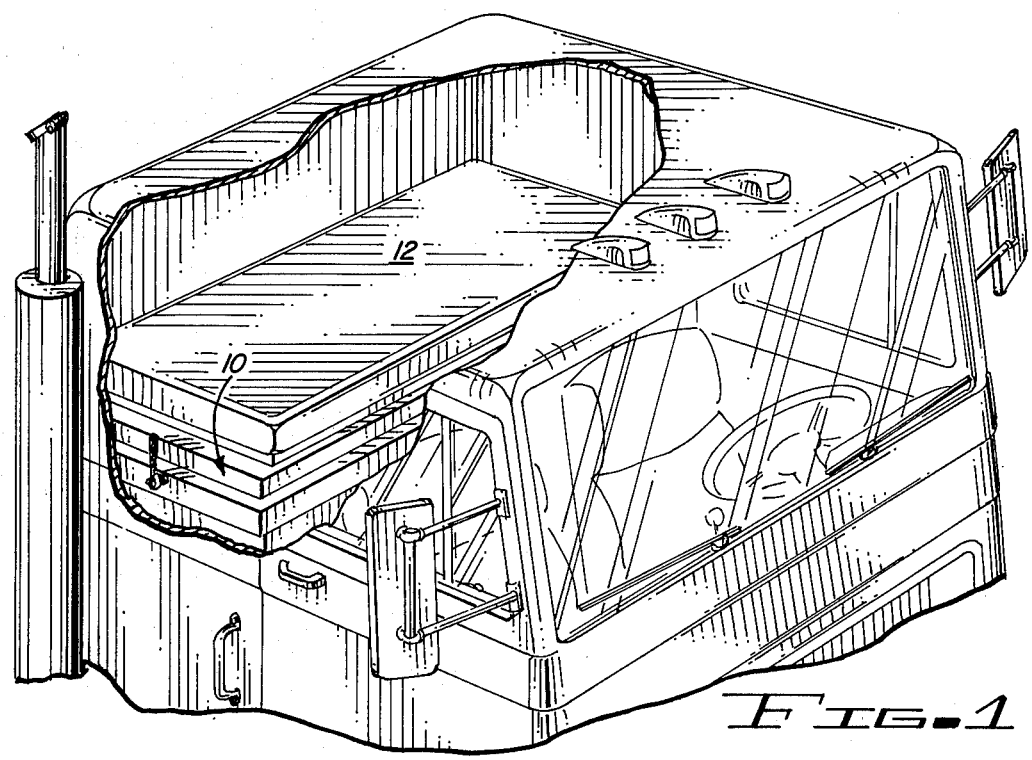
FIG. 1 is a partially cutaway, perspective view of a truck cab showing the mattress suspension system of the present invention installed therein.

FIG. 1 is a partially cutaway, perspective view of the cab of a truck showing how a mattress suspension system 10 can be inserted between a horizontally oriented sleeping deck of the truck and a mattress 12. A rectangular wooden sheet may be inserted between mattress 12 and suspension system 10 to prevent the mattress from sagging.

Figure 2:
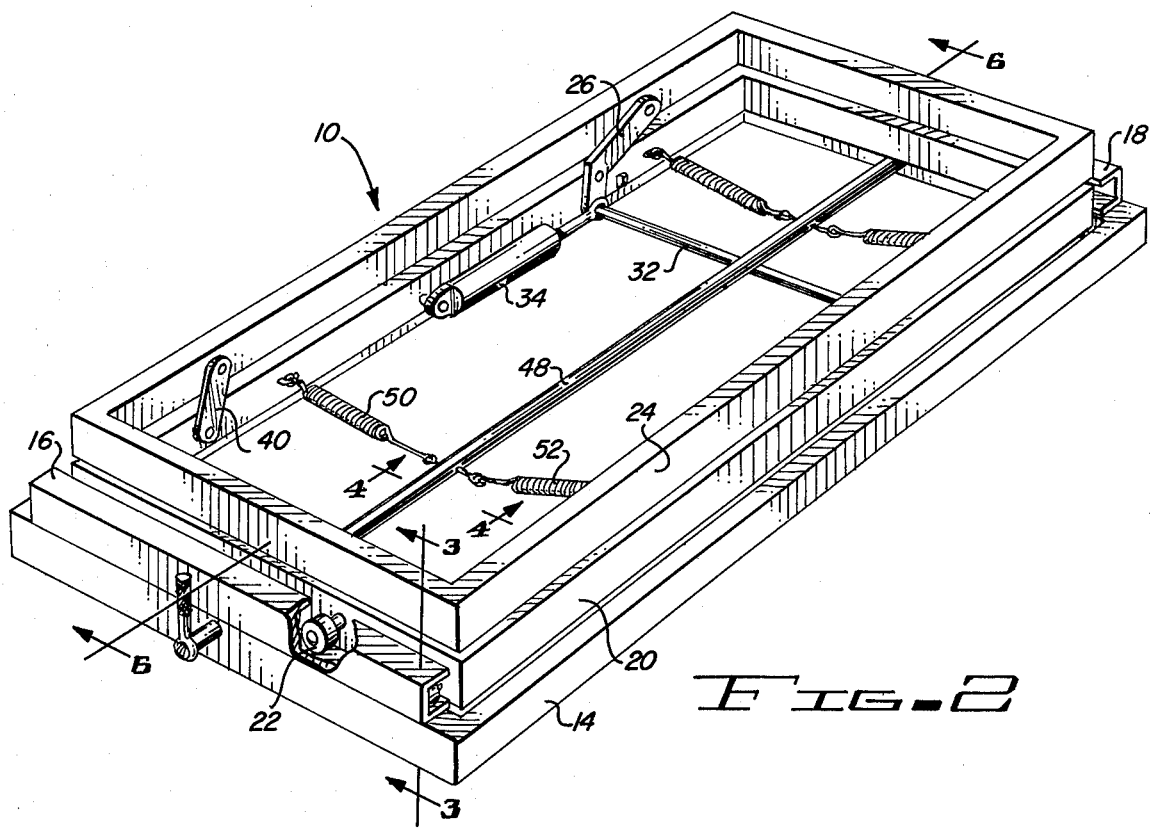
FIG. 2 is a perspective view of a mattress suspension system of the present invention.

FIG. 2 is a more detailed perspective view of mattress suspension system 10. A lower frame 14 directly contacts a horizontal deck of the truck cab and includes guide means in the form of channels or tracks 16 and 18 which are positioned on opposing ends thereof.

Intermediate frame 20 is positioned above lower frame 14 and includes a plurality of rollers, such as roller 22, which extend from each end of intermediate frame 20. This plurality of rollers is designed to fit within tracks 16 and 18 to permit intermediate frame 20 to be displaceable in a fore-and-aft direction with respect to lower frame 14.

An upper frame 24 is maintained above and in a fixed fore-and-aft position with respect to the intermediate frame 20 by a damper system, one half of which is most clearly illustrated in FIGS. 2 and 6. The damper system includes a lever arm 26 which is pivotably attached to intermediate frame 20 by pin 28 and to upper frame 24 by pin 30. A rod or shaft 32 is rigidly attached to the lower end of lever arm 26. Shaft 32 extends horizontally from the lower end of lever arm 26 to a symmetrically disposed lever arm identical in nature to lever arm 26 which is coupled to the opposite side of intermediate frame 20. Shaft 32 is rigidly coupled to this symmetrically disposed lever arm.

A compressed air shock absorber 34 is pivotally connected to intermediate frame 20 by pin 36. A shaft 38 extends from shock absorber 34 and is pivotally connected to shaft 32. A metal link 40 is pivotably connected to upper frame 24 and to intermediate frame 20 by pins 42 and 44. A metalic bracket 46 extends from the interior side of lower frame 14 to limit the maximum rotation of lever arm 26 about pin 28 and to thereby limit the maximum extension of shaft 38 from shock absorber 34. Bracket 46 limits the maximum upward extension of the righthand side of upper frame 24 which is designed to support the upper torso region of an individual reclining on the mattress support system.

While FIG. 6 discloses only a single half of the damper system, it can be readily understood that the remaining half of the damper system will be a mirror image of the portion shown in FIG. 6. Shaft 32 spans the distance between the two halves of the damper system and causes them to operate in unison.

A fore-and-aft biasing means is provided to damp and to limit the fore-and-aft travel of the intermediate frame with respect to the lower frame and to recenter intermediate frame 20 with respect to lower frame 14 after the termination of a fore-and-aft excursion therebetween. This fore-and-aft biasing means is best illustrated by references to FIGS. 2, 3, 4 and 5. A shaft 48 extends between the two ends of lower frame 14. A spring means consisting of one or more paired springs, such as springs 50 and 52, is coupled between shaft 48 and the interior sides of intermediate frame 20.

A biasing adjustment means is provided to vary the spring tension exerted between lower frame 14 and intermediate frame 20 in order to adjust the mattress suspension system to accommodate passengers of varying weight. The fore-and-aft bias adjustment means includes a ratchet assembly 54 including a ratchet handle 56 and a ratchet mechanism (not shown) of a type well known in the art for permitting shaft 48 to be rotated incrementally in a clockwise direction to increase the tension of the biasing means or to be incrementally rotated in a clockwise direction in order to decrease the biasing force. A length of cord 58 is attached to the interior ends of springs 50 and 52 and passes through the center of shaft 48 in the manner shown in FIG. 5. Cord 58 can be either wrapped onto or unwrapped from shaft 48 as ratchet assembly 54 is operated.

The amplitude of up and down excursions transmitted by the truck cab to a sleeping individual are reduced by the vertical damping system illustrated in FIGS. 6 and 7. A source of air under pressure is coupled to each of the two air shock absorbers. When an individual is not reclining on mattress 12, the air pressure coupled to shock absorber 32 will cause its shaft 38 to be fully extended and will force the lower portion of lever arm 26 into abutting contact with bracket 46. FIG. 6 illustrates the position of lever arm 26 and upper frame 24 when an individual is reclining on mattress 12 placed above upper frame 24. As can be noted a slight gap between the lower portion of lever arm 26 and bracket 46 exists indicating that the weight of the individual's upper torso has caused a small displacement of shaft 38 back into shock absorber 34.

A rapid upward displacement of the truck cab will produce an identical upward displacement of lower frame 14 and intermediate frame 20. As a result of the presence of the damper system between these two frame elements and upper frame 24, the resulting vertical displacement of upper frame 24 will be of a smaller amplitude and will occur at a lower velocity than the amplitude and velocity of the vertical movement of the truck cab which was induced by an irregularity in the road.

Link 40 and pins 42 and 44 are provided to allow the necessary pivotal motion between upper frame 24 and intermediate frame 20. It would be possible to install a shock absorber/lever arm assembly on the left side of the mattress suspension system in lieu of link 40 to provide a shock absorbing feature for the sleeping passenger's lower extremities. This was not done in the preferred embodiment since it would unduly increase the complexity of the suspension system and since an individual's lower extremities are far less sensitive to road induced shocks than is his upper torso region.

FIG. 8 illustrates the damper biasing means which adjusts the shock absorbers to accomodate individuals of varying body weight. A source of high pressure air from the truck is coupled to a tube 60 which is connected to a three-way valve 62. The output of valve 62 is coupled to the air shock absorbers. An air pressure gauge 64 may be coupled between valve 62 and the shock absorbers in order to facilitate the measurement of the air pressure being supplied to the shock absorbers. Valve 62 permits the pressure within the pair of air shock absorbers to be adjusted to an appropriate level for a given body weight to allow for optimum operation of the mattress suspension system.

Wile the preferred embodiment of the mattress suspension system has been described as having a pair of air shock absorbers, it is equally possible to design a system having either a single shock absorber or a plurality of shock absorbers. If a mattress suspension system having only a single shock absorber is fabricated, it would be necessary to install that single shock absorber at a point centrally located along shaft 32. Furthermore, pin 36 would have to be converted into a shaft extending from one side of intermediate frame 20 to the other side thereof to provide a mounting point for the rear portion of the shock absorber.

It will be apparent to those skilled in the art that the disclosed mattress suspension system may be modified in numerous other ways and may assume many embodiments differing from the preferred forms specifically set out and described above. Accordingly, it is intended by the appended claims to cover all such modifications of the invention which fall within the true spirit and scope of the invention.

What is claimed:

1. A mattress suspension system attachable to a horizontally oriented deck of a vehicle for substantially reducing the amplitude of fore-and-aft excursions and of up and down excursions which are transmitted by the vehicle to an individual reclining on a mattress positioned above said suspension system, said suspension system comprising in combination:
   (a) a lower rectangular frame positionable above the deck and having first and second ends;
   (b) an intermediate rectangular frame having first and second ends and including roller means on the first and second ends thereof, said roller means being coupled to said lower frame for permitting a limited amount of fore-and-aft travel but not tilting of said intermediate frame with respect to said lower frame in response to fore-and-aft excursions of the vehicle;
   (c) an upper rectangular frame positionable above said lower and said intermediate frames and below the mattress; and
   (d) damper means coupled to said upper and said intermediate frames for maintaining said upper frame above and in a fixed fore-and-aft position with respect to said intermediate frame and for permitting damped up and down excursions but not tilting of said upper frame with respect to said intermediate frame in response to up and down excursions of said vehicle.

2. The mattress suspension system according to claim 1 further including fore-and-aft biasing means coupled to said lower frame and to said intermediate frame for damping fore-and-aft excursions of said intermediate frame with respect to said lower frame for biasing said intermediate frame to a predetermined position with respect to said lower frame.

3. A mattress suspension system attachable to a horizontally oriented deck of a vehicle for substantially reducing the amplitude of fore-and-aft excursions and of up and down excursions which are transmitted by the vehicle to an individual reclining on a mattress positioned above said suspension system, said suspension system comprising in combination:
   (a) a lower frame positionable above the deck and having first and second ends;
   (b) an intermediate frame having first and second ends and including roller means on the first and second ends thereof, said roller means being coupled to said lower frame for permitting a limited amount of fore-and-aft travel of said intermediate frame with respect to said lower frame in response to fore-and-aft excursions of the vehicle, said intermediate frame including first and second sides;
   (c) an upper frame positionable above said lower and said intermediate frames and below the mattress;
   (d) damper means coupled to said upper and said intermediate frames for maintaining said upper frame above and in a fixed fore-and-aft position with respect to said intermediate frame and for permitting damped up and down excursions of said upper frame with respect to said intermediate frame in response to up and down excursions of said vehicle; and
   (e) fore-and-aft biasing means coupled to said lower frame and to said intermediate frame for damping fore-and-aft excursions of said intermediate frame with respect to said lower frame and bias said intermediate frame to a predetermined position with respect to said lower frame said fore-and-aft biasing means including:
      (i) a shaft means extending from the first end of said lower frame to the second end thereof; and
      (ii) spring means coupled between the first and second sides of said intermediate frame and said shaft means for exerting a biasing force on said intermediate frame.

4. The mattress suspension system according to claim 1 wherein said roller means includes:
   (a) first guide means coupled to the first end of said lower frame; and
   (b) second guide means coupled to the second end of said lower frame.

5. The mattress suspension system according to claim 4 wherein said roller means includes:
   (a) a first plurality of rollers extending from the first end of said intermediate frame into said first guide means; and
   (b) a second plurality of rollers extending from the second end of said intermediate frame into said second guide means.

6. A mattress suspension system attachable to a horizontally oriented deck of a vehicle for substantially reducing the amplitude of fore-and-aft excursions and of up and down excursions which are transmitted by the vehicle to an individual reclining on a mattress positioned above said suspension system, said suspension system comprising in combination:
   (a) a lower frame positionable above the deck and having first and second ends;
   (b) an intermediate frame having first and second ends and including roller means on the first and second ends thereof, said roller means being coupled to said lower frame for permitting a limited amount of fore-and-aft travel of said intermediate frame with respect to said lower frame in response to fore-and-aft excursions of the vehicle;

(c) an upper frame positionable above said lower and said intermediate frames and below the mattress, said upper frame including first and second sides; and (d) damper means coupled to said upper and said intermediate frames for maintaining said upper frame above and in a fixed fore-and-aft position with respect to said intermediate frame and for permitting damped up and down excursions of said upper frame with respect to said intermediate frame in response to up and down excursions of said vehicle, said damper means including:
 (i) a first lever arm having first and second ends and a central portion, said first end being pivotally coupled to said upper frame and the central portion being pivotally coupled to said intermediate frame;
 (ii) a second lever arm having first and second ends and a central portion, said first end being coupled to said upper frame and the central portion being pivotally coupled to said intermediate frame;
 (iii) shaft means coupled to the second end of said first lever arm and to the second end of said second lever arm; and
 (iv) shock absorber means having a first end coupled to said shaft and a second end coupled to said intermediate frame.

7. The mattress suspension system according to claim 1 wherein said damper means includes:
 (a) a first lever arm having a first end, a second end and a central portion, said first end being coupled to said upper frame and said central portion being coupled to said intermediate frame; and
 (b) shock absorber means having a first end coupled to the second end of said lever arm and a second end coupled to said intermediate frame.

8. The mattress suspension system according to claim 7 wherein said damper means further includes damper biasing means for adjusting the damping force provided by said shock abosorber means.

9. A mattress suspension system attachable to a horizontally oriented deck of a vehicle for substantially reducing the amplitude of fore-and-aft excursions and of up and down excursions which are transmitted by the vehicle to an individual reclining on a mattress positioned above said suspension system, said suspension system comprising in combination:
 (a) a lower frame positionable above the deck and having first and second ends;
 (b) an intermediate frame having first and second ends and including roller means on the first and second ends thereof, said roller means being coupled to said lower frame for permitting a limited amount of fore-and-aft travel of said intermediate frame with respect to said lower frame in response to fore-and-aft excursions of the vehicle;
 (c) an upper frame positionable above said lower and said intermediate frames and below the mattress; and
 (e) damper means coupled to said upper and said intermediate frames for maintaining said upper frame above and in a fixed fore-and-aft position with respect to said intermediate frame and for permitting damped up and down excursions of said upper frame with respect to said intermediate frame in response to up and down excursions of said vehicle, said damper means including:
  (i) a first lever arm having a first end, a second end and a central portion, said first end being coupled to said upper frame and said central portion being coupled to said intermediate frame at a point toward the first end thereof; and
  (ii) shock absorber means having a first end coupled to the second end of said lever arm and a second end coupled to said intermediate frame said damper means further including spacer means coupled between said upper frame and said intermediate frame for maintaining a relatively fixed distance between the second end of said upper frame and the second end of said intermediate frame.

10. The mattress suspension system according to claim 9 wherein said spacer means further includes a link.

* * * * *

UNITED STATES PATENT AND TRADEMARK OFFICE
CERTIFICATE OF CORRECTION

PATENT NO. : 4,107,797
DATED : August 22, 1978
INVENTOR(S) : George E. Maxwell

It is certified that error appears in the above-identified patent and that said Letters Patent are hereby corrected as shown below:

In column 8, line 18, delete "(c)" and substitute therefor --(d)--.

Signed and Sealed this

Third Day of April 1979

[SEAL]

Attest:

RUTH C. MASON
Attesting Officer

DONALD W. BANNER
Commissioner of Patents and Trademarks